Dec. 29, 1942.  I. JUNG  2,306,953
GAS TURBINE PLANT FOR PROPULSION OF WATER AND AIR CRAFT
Filed Aug. 5, 1938  3 Sheets-Sheet 1

Inventor:
Ingvar Jung,
By Potter, Pierce & Scheffler,
Attorneys.

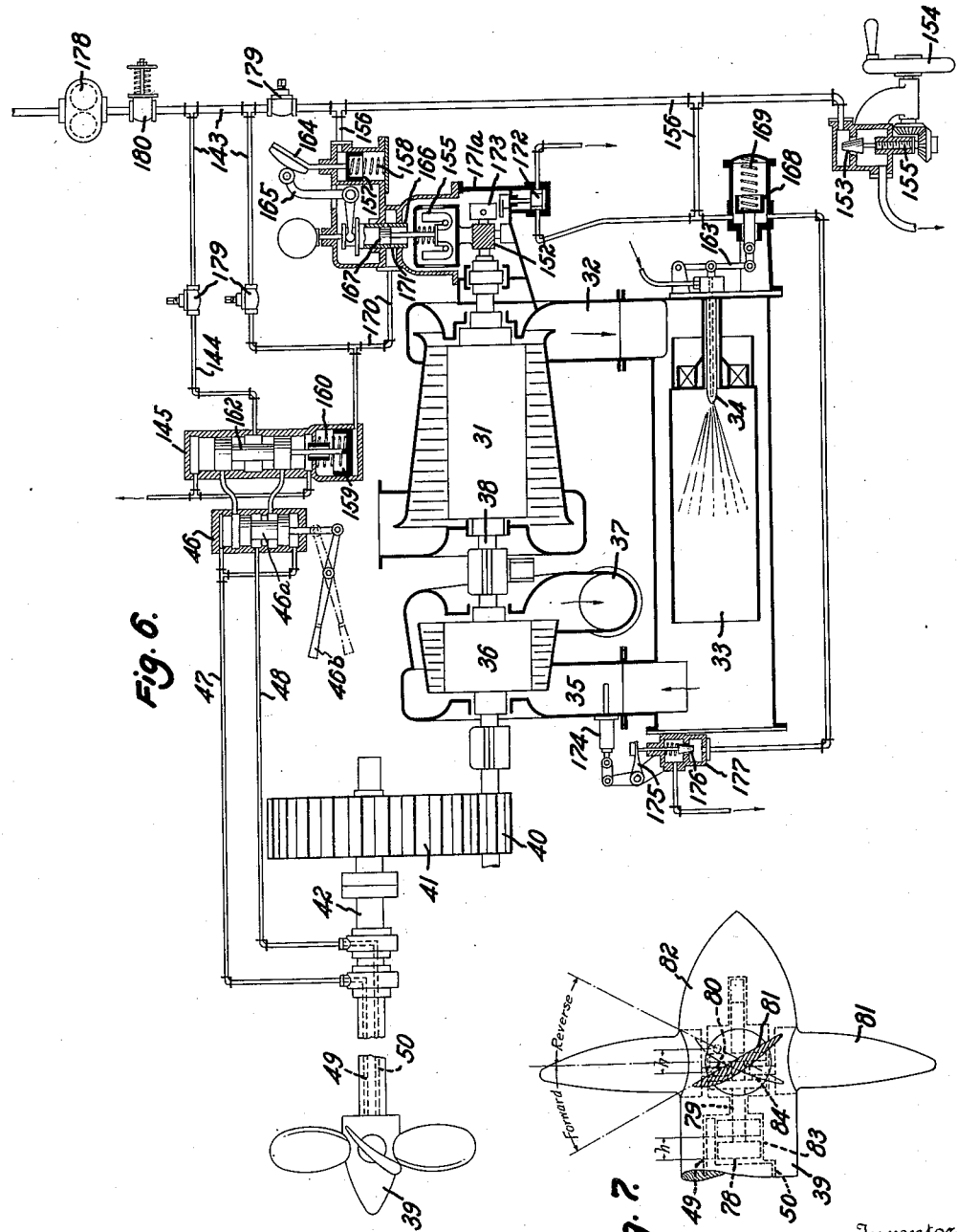

Patented Dec. 29, 1942

2,306,953

UNITED STATES PATENT OFFICE 2,306,953

GAS TURBINE PLANT FOR PROPULSION OF WATER AND AIR CRAFT

Ingvar Jung, Baden, Switzerland, assignor to Aktiengesellschaft Brown, Boveri & Cie., Baden, Switzerland, a joint-stock company Application August 5, 1938, Serial No. 223,332
In Germany August 24, 1937

5 Claims. (Cl. 170—135.6)

The present invention relates to gas turbine plants for propulsion of water and air craft and to methods of operating the same.

An object of the invention is to provide a gas turbine plant propulsion system for water or air craft in which the turbine plant is operated at maximum efficiency at all times.

Another object is to provide a gas turbine plant propulsion system including a variable pitch propeller and means responsive to operating conditions of said plant for regulating the angle of incidence of the propeller blades so as to establish and maintain at all times a desired ratio between propeller moment and driving moment of the plant whereby to control the speed of the plant by variation of the propeller moment and thus enable operation of the plant at maximum efficiency throughout a wide range of speeds of the propelled craft.

Another object is to provide a gas turbine plant propulsion system for water or air craft including a coupled gas turbine-air compressor unit, a variable pitch propeller driven by said unit and means responsive to the speed of said unit for varying the angle of incidence of the blades of the propeller in such manner as to maintain a propeller moment adjusted independently of the speed of the propeller to agree with the driving moment of the turbine plant at a predetermined desired rotational speed of the latter.

A further object is to provide means responsive to the speed of the turbine plant operative to regulate the fuel supply thereto in order to prevent overrunning and consequent damage to the plant when reversing the pitch of the propeller blades or otherwise when the driving moment is considerably greater than the propeller moment.

Figure 1:
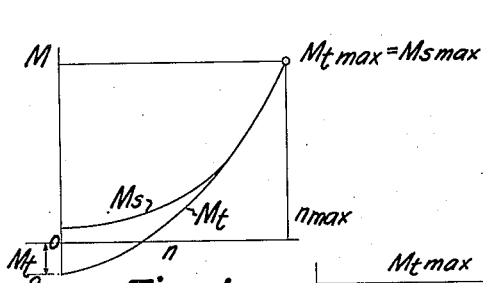
Figure 3:
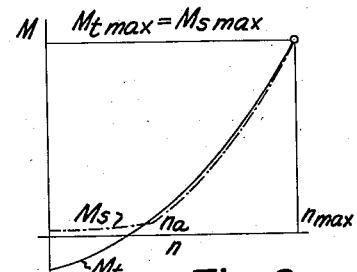
Figure 2:
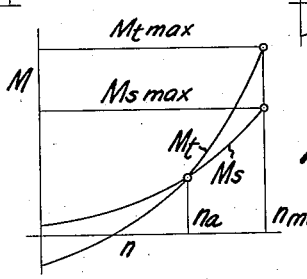
Figure 4:
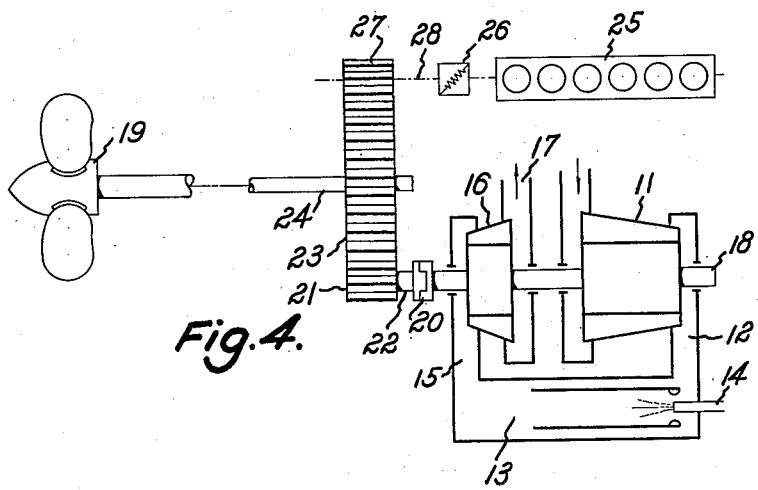
Figure 5:
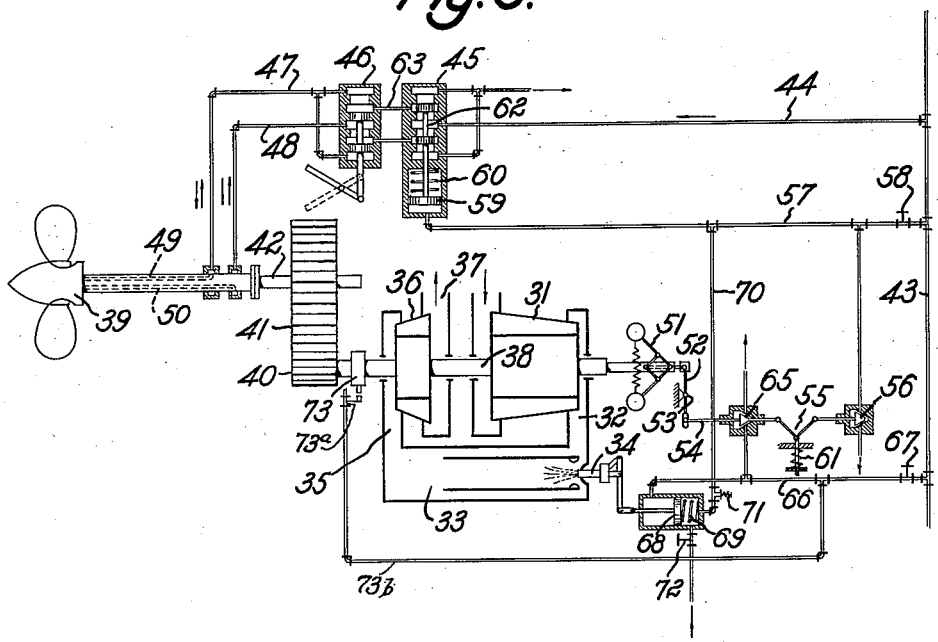

Other objects and advantages of the invention and method of operating the gas turbine-air compressor propulsion system according to the invention will become apparent during the course of the following specification and upon reference to the accompanying drawings, in which:

Fig. 1 is a graph illustrating the relation between driving moment and propeller moment of a gas turbine plant and connected fixed pitch propeller calculated for a moment equivalent to the maximum driving moment of the plant at optimum speed, Fig. 2 is a graph illustrating the relation between driving moment and propeller moment of a gas turbine plant and connected fixed pitch propeller calculated for a moment less than the maximum driving moment of the plant at optimum speed, Fig. 3 is a graph illustrating the relation between propeller moment and driving moment of a system employing a gas turbine plant and connected variable pitch propeller operated according to the invention, Fig. 4 is a diagrammatic showing of a gas turbine plant and connected variable pitch propeller embodying the invention, Fig. 5 is a diagrammatic showing of a gas turbine plant and connected variable pitch propeller embodying automatic controls according to the invention, Fig. 6 is a semi-diagrammatic view of a gas turbine plant and connected variable pitch propeller showing a concrete example of the application of the automatic controls contemplated by the invention, and Fig. 7 is a diagrammatic view showing a propeller pitch adjusting mechanism.

In the following description the entities discussed are represented by characters as follows:

$Ms$ indicates the rotary moment to be assumed by the ship's propeller;

$Mt$ indicates the rotary moment developed by the turbine plant;

$n$ indicates the number of revolutions of the turbine shaft.

In a gas turbine plant with constant combustion pressure comprising an air compressor, combustion chamber and directly coupled gas turbine, the driving moment $Mt$ of the plant increases from a negative value $Mt_0$, at rest, to a maximum value $Mt_{max}$, at maximum or optimum speed, as indicated in Figs. 1 to 3. If the gas turbine group is connected, either directly or through a transmission gearing to drive a fixed pitch propeller in which the angle of incidence of the blades is calculated for a full moment, $Ms_{max}$ equal to the turbine plant driving moment, $Mt_{max}$ at full speed, $n_{max}$ as represented in Fig. 1, the group can only operate at substantially normal or full speed and starting and low speed operation is impossible since at low turbine speeds, the propeller moment $Ms$ is greater than the driving moment $Mt$.

If the fixed pitch propeller is calculated for a smaller moment, $Ms_{max}$, it is possible to start up from a partial load with a turbine speed less than $n_{max}$, as represented in Fig. 2. However in such a system, the full power of the turbine cannot be utilized at maximum speeds, since the turbine must be throttled down in order to prevent it from racing.

In order to overcome this problem of the moment curve of the constant pressure gas turbine, the invention provides for the utilization of an adjustable pitch propeller with which it is possible to regulate the rotary moment of the propeller, independently of the speed of revolution thereof, within wide limits. In such a system, it is possible, as illustrated in Fig. 3, to utilize the turbine drive in starting up from a comparatively low speed, $n_a$, without too great a starting power demand on the gas turbine plant.

Turbo-type compressors, particularly of the axial flow kind such as are preferably used for supplying combustion air to gas turbines, on account of their high efficiency, must be run at a definite speed for each quantity of air to be delivered in each case. Therefore, in the operation of a gas turbine plant according to the invention in which the gas turbine drives its own compressor, maximum efficiency can only be attained when the turbine group is forced to run at the speed at which the compressor delivers the required quantity of air at maximum efficiency. If this mode of operation is not adhered to, the efficiency decreases considerably.

If, therefore, a gas turbine set is to operate with the best possible efficiency, it is essential to make arrangements whereby the required power output is obtained at the definite speed which corresponds to this output. According to the invention this is attained by adjusting the pitch of the propeller blades by means of a governor whose control speed is always fixed to be in agreement with the quantity of fuel required for the power in question.

In Fig. 4, which illustrates diagrammatically a ship drive according to the invention with cruising speed Diesel motors, full speed gas turbine plant and an adjustable pitch propeller driven thereby, 11 is an axial flow air compressor for supplying air through a passage 12 to a combustion chamber 13 to which fuel is supplied through an injection nozzle 14. The combustion gases pass directly from the combustion chamber 14 through passage 15 to the front or high pressure side of a gas turbine 16 and exhaust through passage 17. The air compressor 11 is directly driven by the gas turbine 16, being mounted on the turbine shaft 18.

The gas turbine is in driving connection to the variable pitch propeller 19 through a releasable clutch coupling 20 and reduction gearing comprising a gear 21 on drive shaft 22 and gear 23 on the propeller shaft 24.

The Diesel motor 25 is coupled to the propeller through a releasable spring coupling 26 and reduction gearing comprising a gear 27 on the drive shaft 28 and the gear 23 on the propeller shaft 24.

During cruising, the Diesel motor 25 is in operation and is in driving connection with the propeller 19 through the coupling 26 and reduction gearing 27, 23. When it is desired to start the gas turbine, the clutch 20 is engaged and the gas turbine group 11—16 is driven by the Diesel motor through the gears 23 and 21 until the turbine group is brought up to a speed at which the driving moment of the turbine is greater than the adjusted maximum propeller moment. From this starting speed, the gas turbine group can be speeded up under its own power and take over the load from the Diesel engine. When this is accomplished, the clutch 26 is thrown out and the cruising engine idles without load, or may be stopped.

Regarding the regulation of a plant of this kind, reference is again made to Fig. 1, where the curve $Mt$ shows the great dependence of the driving moment on the speed of the gas turbine group. The driving moment decreases approximately with the square of the speed of the turbine group, becoming negative at a certain minimum speed of the turbine group.

According to a further embodiment of the invention, the angle of incidence of the blades of the adjustable pitch propeller is regulated in such a way that there is always obtained a propeller moment that is adjusted to maintain it in substantial equilibrium with the driving moment $(n-M)$ of the gas turbine plant at a desired speed $(n)$ of the latter.

The driving moment of the gas turbine group is dependent on the speed, the amount of motive gas and the temperature of the gas turbine. The amount of motive gas is determined automatically and directly by the speed of the compressor, if the temperature in front of the gas turbine is kept approximately constant. It is advisable to keep this temperature as high as the vane material of the turbine permits in continued operation, i. e., to regulate the speed of the compressor by change in adjustment of the angle of incidence of the propeller blades to vary the propeller moment so that the compressor always supplies the amount of air necessary to attain the desired maximum temperature of the gas in front of the turbine. This regulation of the propeller can be accomplished by thermostatic controls acting on the propeller adjusting mechanism under control of a thermostat positioned in front of the turbine, as shown in Fig. 6 and hereinafter described in greater detail. Such a thermostatic regulation may be accomplished by controlling the passage of regulating fluid under pressure to a suitable servo-motor located in the hub of the variable pitch propeller for varying the angle of incidence of the blades thereof.

During reversing, that is while changing the position of the propeller blades from a position for forward drive to one for reverse drive, or vice versa, it is not possible to regulate the power and speed of the turbine group by adjustment of the propeller blades because in passage between the positions for forward and reverse drive, the propeller moment sinks to the minimum and the gas turbine would burn through if no limiting regulator were present. When the reversing operation is completed, the power and speed of the turbine group can again be regulated by adjustment of the angle of incidence of the propeller blades, whether in forward or reverse position.

During the operation of shifting the propeller blades between forward and reverse position, limitation of speed of the turbine compressor group is effected, according to the invention, by reducing the temperature of the incoming gas and also the amount of fuel.

The plant shown diagrammatically in Fig. 5 embodies by way of example a system of regulation in which the angle of incidence of the blades of the variable pitch propeller is adjusted so that there is always maintained a propeller moment that is adapted to the desired speed $(n)$ and the desired power output $(n \cdot M)$ of the gas turbine plant. As in the previous example, this system includes an axial air compressor 31, delivering combustion air through a passage 32 to the combustion chamber 33 in which combustion takes place with a comparatively very high excess of air, fuel being supplied through the injection nozzle 34. The combustion gases pass directly from the combustion chamber through passage 35 from which they exhaust through passage 37. The air compressor is directly driven from the turbine shaft 38.

The gas turbine drives the adjustable pitch propeller 39 through the reduction gearing comprising the gears 40 and 41 on the turbine shaft 38 and propeller shaft 42 respectively.

The angle of incidence of the blades of the adjustable pitch propeller 39 is adjusted through the medium of oil under pressure supplied to a fluid operated servo motor of suitable construction housed within the hub of the propeller and operatively connected with the propeller blades, as shown in Fig. 7. The oil under pressure for operation of the propeller adjusting motor is taken from a pressure line 43 in which a constant pressure is maintained from a suitable source of supply and is transmitted through an oil line 44 to a regulating valve 45 which governs the flow of oil to and from the servo motor. The oil under pressure passes from the valve 45 to a reversing valve mechanism 46 and thence through one of the lines 47 and 48 to the respective passages 49 and 50 in the propeller shaft 42 and to the servo motor in the propeller hub.

As shown diagrammatically in Fig. 7, the propeller blades 81 are each provided with a shank mounted for axial adjustment or rotation in the hub 82 between the maximum angle of incidence for forward and a maximum angle for reverse travel. The servo motor in the propeller hub 39 includes an axially disposed cylinder 83 having a double acting reciprocating piston 78 working therein. The piston is connected by a sliding rod 79 to a sliding bearing head 84 which is provided with sockets for the reception of crank pins 80 mounted eccentrically of the axis of the shanks of the vanes or blades 81. The oil lines 47 and 48 are connected to opposite ends of the cylinder 83. The distance $h$ represents the working stroke of the piston and it will be obvious that as the piston is actuated by the oil pressure introduced through passages 47 and 48 rotary adjustment of the propeller blades will be effected by the resultant movement imparted to the crank pins 80.

The operation of the regulator 45 for adjusting the angle of incidence of the propeller blades is automatically controlled by a speed responsive governor 51 through the medium of oil under pressure. The governor 51 is driven by the compressor shaft 38 and acts on one end of a pivoted lever 52 fulcrumed at 53. The other end of the lever 52 is pivotally connected to a slide rod 54 which through a toggle connection 55 operates a pressure adjusting valve 56 which controls the pressure in a line 57 connected at one end through a throttle 58 to the constant pressure line 43 and at the other end to one side of a plunger 59 in the regulator 45. The oil pressure on one side of the plunger 59 is balanced by a spring 60 acting on the other side thereof when the speed of the gas turbine group is within the desired limit. Adjustment of the speed at which the governor will act to close the pressure adjusting valve 56 is accomplished by adjusting the tension of the spring 61 acting on the toggle connection between the governor and the valve.

Operation

The described mechanism for regulating the angle of incidence of the propeller blades operates in the following manner. If the speed of the turbine compressor group exceeds that for which adjustment has been made, the governor, through the connections described, actuates the pressure adjusting valve 56 to close the same, thereby shutting off the by-pass of pressure fluid from the line 57 through the valve 56. This results in an increase of pressure in line 57 which acts on the plunger 59 to overcome the balancing pressure of the spring 60 to shift the distributing slide valve element 62 of the regulator 45 to allow oil under pressure to flow through the line 63. The reversing mechanism 46 includes a sliding valve member 46ª operated by a lever 46ᵇ for reversing the connections of the oil lines 47 and 48 leading to the propeller adjusting servo motor. Thus the propeller blades may be positioned for forward or reverse travel of the ship. With the reversing mechanism set for forward travel, the oil under pressure flows through the line 63 to the reversing mechanism 46 and thence through the line 47 to the servo motor in the propeller hub to enlarge the angle of incidence of the propeller blades in the forward driving range.

The rotary moment of the propeller is thereby increased and the speed of the turbine group is correspondingly reduced due to the increased load thereon. When the speed of the turbine group falls to the value for which adjustment has been made, the pressure regulating valve 56 opens to the point at which the pressure in the line 57 will balance the tension of the spring 60 to permit the slide valve element 62 to return to the neutral position shown in Fig. 5, thereby cutting off the flow of motive oil to and from the servo motor in the propeller hub. When running in reverse, the propeller regulation occurs in a similar manner except that shifting of the reversing mechanism results in supplying the motive oil under pressure to the servo motor through the line 48 instead of line 47 to effect propeller regulation in the reverse position.

When the mechanism 46 for reversing the direction of travel is operated, the rotary moment of the propeller becomes smaller as the angle of incidence of the blades is decreased and may even fall to a negative minimum value as the angle of incidence of the blades passes between positive for forward travel and negative for reverse travel, rising again as the angle is increased in the reverse position.

In order to prevent the turbine group from racing during this short transition period, means are provided for regulating the fuel supply. The amount of fuel that is supplied to the combustion chamber through the injection nozzle 34 is regulated during normal operation of the plant in definite relation to the amount of air by a suitable thermostat in front of the turbine or by the arrangement as shown in Fig. 5.

The speed responsive governor 51, through the lever 52 and slide rod 54, controls a fuel regulator 65 acting as a pressure regulating relief valve which governs the pressure in oil line 66 connected at one end through a throttle 67 to the constant pressure line 43 and at its other end to one side of servo motor piston 68, which is connected to the adjustable fuel nozzle 34 and thus controls the fuel supply. The spring 69 of the servo motor acting on the other side of the piston balances the pressure of oil in the line 66. Since the oil pressure in line 66 is under control of the speed responsive governor on the compressor shaft, the servo motor adjusts the amount of fuel in proportion to the amount of air supplied by the compressor, whereby the temperature of the combustion gases entering the gas turbine is kept substantially constant.

When the mechanism 46 is operated for reversing the direction of travel, the speed regulator 45 operates at first in the reverse sense so that as the propeller moment decreases the speed of the turbine group increases still more rapidly. When the speed of the turbine groups exceeds a predetermined speed the governor 51 closes the valve 56 entirely and opens the relief valve 65. The oil pressure in lines 57 and 70 then increases to the full working pressure of the pressure line 43. With such increase in pressure, oil flows through the line 70 past the spring loaded valve 71 to the side of the servo motor piston 68 influenced by spring 69, thereby supplementing the pressure of the spring 69 against the oil pressure in line 66 to shift the piston and reduce the fuel supply until the governor 51 reopens the valve 56 to reduce the pressure in lines 57 and 70 so that the spring loaded valve 71 closes and shuts off the oil pressure supplementing the spring 69. A throttle 72 governs the escape of oil from the fuel regulating servo motor and serves for adjusting the fuel and speed regulation.

It is to be noted that with normal regulating oil pressure in lines 57 and 70, the oil pressure in these lines does not affect the fuel regulation, but when the pressure becomes abnormally high due to full closing of valve 56 at excessive turbine speeds, the valve 71 opens to permit this pressure to act on the fuel regulator and reduce the fuel supply.

A safety governor 73 is provided for reducing the fuel supply at dangerously high speeds. The safety governor 73 is of a well known type in which a pin is thrown outwardly by centrifugal force when excessive speeds are attained and this pin acts to open a relief valve 73a in the line 73b to relieve the pressure in line 66 and thereby permit the spring 69 to reduce the fuel supply. It is also understood that a suitable Diesel motor or other prime mover is provided for driving the turbine group when starting it into operation.

Referring to Fig. 6, in which a system according to the invention including a thermostatic regulation of the fuel supply to prevent overrunning of the group is shown and in which the regulating elements are shown in greater detail, the set is adjusted to give a certain output by means of valve 153. This valve is actuated by a handwheel 154 and opened so far, for instance by means of a screw-threaded spindle 155, that a certain amount of oil can escape from the pressure line 156 which is supplied with oil under pressure from pump 178. This has the effect of producing a definite oil pressure in the pipe line 156. This oil pressure also acts on pistons 168 and 157, both of which under the counter-effect of their respective springs 169 and 158 also attain definite positions of adjustment. Piston 168 controls, by means of rods 163, the fuel supply to the nozzle 134. Piston 157 effects the adjustment of sleeve 166 by means of the cam 164 and bell-crank lever 165.

In order that the gas turbine can be started and run with maximum efficiency, it must, as previously explained, have a definite speed corresponding to each power output. This speed is that at which the compressor delivers the required amount of air for the motive gas with maximum efficiency.

The shape of the cam path 164 is such that corresponding to each setting of the fuel nozzle 134, that is to say for each given quantity of fuel, there is a quite definite position of the sleeve 166. Inside this sleeve 166 a reciprocable piston 167 is arranged, the position of which is controlled by the governor 151.

In order that the set can maintain the desired speed necessary for operation at maximum efficiency, it is necessary that the counter-torque or the power demand of the propeller should also be adjusted to correspond to this speed. This is achieved according to the invention by adjusting the pitch of the propeller blades by means of the devices as previously described, including the regulating valve 145 which governs the flow of oil to the servo-motor operating the propeller blades to change the pitch thereof. In the valve 145 the regulating slide element 162 is actuated through piston 159 in response to the pressure in the oil system 170, to which the action of the spring 160 is opposed, causing the piston 159 and the control valve element 162 to occupy a definite position. The oil pressure in system 170 is, however, determined by the amount of oil which can flow through the openings 171 in the sleeve 166 and escape into the crank-case 171a. This is dependent upon the position of the piston 167 with respect to the said openings 171 in the sleeve 166. If the speed of the set differs from the speed of maximum efficiency corresponding to the setting of regulator 153, due to incorrect adjustment of the propeller blades, the piston 167 moves inside the sleeve 166 under the influence of governor 151 to vary the opening through escape ports 171 until such an oil pressure is obtained in the system 170 that by means of the control valve element 162 the propeller blades are adjusted to the angle of incidence which is required for the desired speed.

As already mentioned, the ratio of fuel and combustion gases should be such that the temperature of the combustion gases is as near the maximum permissible value as possible, that is to say, as high as the blade material of the gas turbine will allow. While the plant could also be regulated by means of a thermostat controlling the position of the sleeve 166, because in order to maintain a definite temperature with a definite quantity of fuel it is also necessary to adjust for a definite compressor speed, a thermostat is not so suitable for regulating the plant under normal operating conditions, but may be employed as a limit governor for preventing the allowable temperatures from being exceeded. In such a case it only comes into action when a certain temperature is reached. A temperature limit governor is illustrated in Fig. 6 comprising a thermostat 174 which actuates the valve 176 by means of lever 175. If the temperature of the motive gases exceeds for instance a temperature of 550° C. in front of the turbine, the valve 176 is opened slightly so that some oil escapes from the casing 177 and the pressure in the oil system 156 drops, with the result that the quantity of fuel is reduced.

The safety governor 173 operates in a similar manner, by opening the stop valve 172 when the maximum speed is exceeded, so that the oil pressure decreases and the fuel valve 134 closes.

In order to be able to feed the three oil systems 156, 170 and 144 by means of a common pump 178 and a common pipe line 143, without pressure variations in one system affecting a neighboring system, each system is separated from the main feed pipe 143 by an adjustable throttle screw 179 through which only a limited quantity of oil can flow. Furthermore, the main pipe line is provided with a pressure limiting valve 180 which allows the surplus oil to escape and thus limits the oil pressure to a definite maximum value.

While preferred embodiments of the invention have been shown and described by way of illustration, it will be understood that various modifications in the details of construction and mode of operation may be resorted to within the scope of the appended claims.

I claim:

1. In a propulsion system for water and air craft, a variable speed gas turbine plant, said plant comprising a gas turbine, a combustion chamber for producing operating gas for said turbine, an air compressor driven by said turbine and supplying combustion air to said combustion chamber, adjustable fuel supply means for supplying fuel to said combustion chamber, an adjustable pitch propeller, a driving connection between said turbine and said propeller, means responsive to the speed of said gas turbine plant for adjusting the angle of incidence of the blades of said propeller, and means for varying the range of response of said last mentioned means in accordance with variations in the amount of fuel supplied whereby to produce a propeller moment sufficient to cause said turbine plant to operate at a compressor speed at which the required amount of combustion air for the amount of fuel supplied is supplied to said combustion chamber by said compressor at maximum efficiency.

2. In a propulsion system for water and air craft, a variable speed gas turbine plant, said plant comprising a gas turbine, a combustion chamber for producing operating gas for said turbine, an air compressor driven by said turbine and supplying combustion air to said combustion chamber, adjustable fuel supply means for supplying fuel to said combustion chamber, an adjustable pitch propeller, a driving connection between said turbine and said propeller, a governor responsive to the speed of said turbine plant, means for adjusting said fuel supply means, means for adjusting the operating range of said governor in response to variations in the amount of fuel supplied, and means under control of said governor for adjusting the angle of incidence of the blades of said propeller to maintain a propeller moment effective to cause said turbine plant to operate at a speed at which said compressor is driven to supply the required amount of combustion air for the amount of fuel supplied to said combustion chamber at maximum efficiency.

3. In a propulsion system for water and air craft, a variable speed gas turbine plant, said plant comprising a gas turbine, a combustion chamber for producing operating gas for said turbine, an air compressor driven by said turbine and supplying combustion air to said combustion chamber, adjustable fuel supply means for supplying fuel to said combustion chamber, an adjustable pitch propeller, a driving connection between said turbine and said propeller, a governor responsive to the speed of said turbine plant, means for adjusting the regulating range of said governor in response to variations in the amount of fuel supplied, and means under control of said governor for adjusting the angle of incidence of the blades of said propeller whereby to maintain a propeller moment sufficient to cause said turbine plant to operate at a compressor speed at which the required amount of combustion air for the amount of fuel supplied is supplied to said combustion chamber by said compressor at maximum efficiency.

4. In a gas turbine plant for propulsion of water and air craft, a coupled group comprising a continuous pressure gas turbine, a combustion chamber for producing motive gas for said turbine, an air compressor driven by said turbine and supplying combustion air to said combustion chamber, adjustable fuel injection means for supplying fuel to said combustion chamber, an adjustable pitch propeller, means for adjusting the angle of incidence of the blades of said propeller to maintain a propeller moment substantially equal to the driving moment of said turbine group at a predetermined speed at which the required amount of combustion air is delivered to said combustion chamber by said compressor at maximum efficiency, said last mentioned means including a governor responsive to the speed of said group, and means for adjusting the regulating range of said governor simultaneously with said fuel injection means to obtain said predetermined speed at a predetermined load on the turbine plant.

5. In a gas turbine plant for propulsion of water and air craft, a coupled group comprising a continuous pressure gas turbine, a combustion chamber for producing motive gas to said turbine, an air compressor driven by said turbine and supplying combustion air to said combustion chamber, adjustable fuel injection means for supplying fuel to said combustion chamber, an adjustable pitch propeller, means for adjusting the angle of incidence of the blades of said propeller to maintain a propeller moment substantially equal to the driving moment of said turbine group at a predetermined speed at which the required amount of combustion air is delivered to said combustion chamber by said compressor at maximum efficiency, said last mentioned means including a governor responsive to the speed of said group, and means for adjusting the regulating range of said governor simultaneously with said fuel injection means, a thermostatic means responsive to the gas temperature in front of said turbine and means under control of said thermostatic means for adjusting said fuel injection means to reduce the amount of fuel supplied when said temperature exceeds a selected maximum.

INGVAR JUNG.